UNITED STATES PATENT OFFICE.

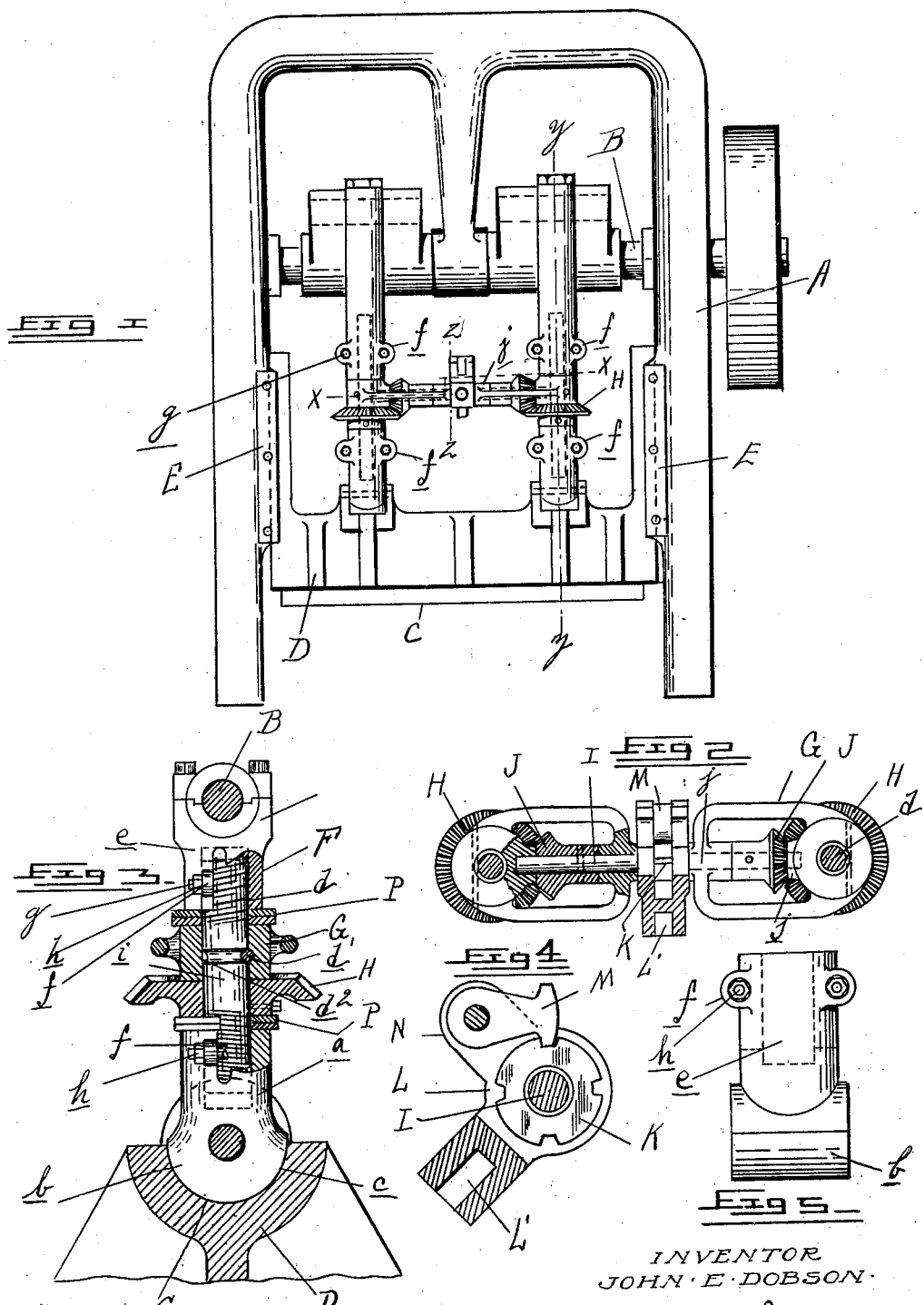

JOHN E. DOBSON, OF YPSILANTI, MICHIGAN, ASSIGNOR TO MICHIGAN MACHINERY MANUFACTURING COMPANY, OF YPSILANTI, MICHIGAN, A CORPORATION OF MICHIGAN.

POWER-PRESS.

No. 810,195.      Specification of Letters Patent.      Patented Jan. 16, 1906.

Application filed January 24, 1905. Serial No. 242,555.

*To all whom it may concern:*

Be it known that I, JOHN E. DOBSON, a citizen of the United States, residing at Ypsilanti, in the county of Washtenaw and State of Michigan, have invented certain new and useful Improvements in Power-Presses, of which the following is a specification, reference being had therein to the accompanying drawings.

The invention relates to power-presses especially designed for stamping or forming sheet metal.

The invention consists in the novel construction of an adjustable connection between the actuating-cranks and the platen, whereby the quick adjustment is facilitated and the strength of parts is increased.

In the drawings, Figure 1 is a front elevation of the press to which my improvements are applied. Fig. 2 is a horizontal section substantially on line $x\,x$ of Fig. 1. Fig. 3 is a vertical section on line $y\,y$. Fig. 4 is a cross-section on line $z\,z$, and Fig. 5 is an elevation of one of the members of the connecting-rod.

A is the frame of the press of suitable construction, in which is journaled the crank-shaft B.

C is the platen, and D is a frame or cross-head carrying said platen, which is vertically slidably engaged with guides E on the frame.

F is a connecting-rod extending between the crank and the bearing C in the cross-head, the construction shown being provided with a pair of these connecting-rods.

With presses of the type above described it is necessary that an adjustment be provided in the connecting-rods between the cranks and platen. This is usually accomplished by forming these rods in sections joined to each other by screw-threaded shanks, and it is also usual where a plurality of connecting-rods are used to gear the shanks of the rods to a common cross-connecting adjustment shaft. Such constructions are, however, usually defective, in that the screw-threaded shank greatly weakens the strength of the connecting-rod, so that an excessive strain often results in bending or breaking the parts. The danger of such breakage is especially great where the shanks are adjusted to lengthen the connecting-rods to any considerable degree, as the cross-section of the shank is necessarily only a fraction of the cross-section of the remainder of the rod. Thus when the shank is projected from the socket portion of the rod it can be easily bent. In the construction shown the rods F are formed of a lower section $a$, which has a segmental lower face $b$ engaging with a socket $c$ in the cross-head. The upper portion of this section $a$ is centrally recessed to form a socket, this socket being threaded to receive the threaded shank-section $d$. The latter section is provided at its opposite ends with right and left screw-threads for respectively engaging the members $a$ and the third section $e$ of the rod, which connects with a crank-shaft B. The section $e$ is provided with a threaded socket similar to that of the section $a$, and each of these sockets is split longitudinally, and the sections thereof are provided with apertured ears $f$ upon opposite sides of this split, through which clamping-bolts $g$ are passed. The bolts $g$ are provided with nuts $h$, and the arrangement is such that by tightening the nuts the portions of the socket on opposite sides of the split will be clamped upon the threaded shanks, so as to prevent relative movement.

The shank member $d$ is provided with a central portion $i$, upon which is sleeved a member G and an adjacent bevel gear-wheel H, rigidly secured to said shank member. The member G projects laterally from the shank $d$ and has formed therein a bearing $j$ for the cross-shaft I. Rigidly mounted on this shaft are the bevel-pinions J, which mesh with the bevel gear-wheels H and are arranged in recesses in the members G, as shown in Figs. 1 and 2. The members G extend toward each other from the rods F, sufficient space being left between for mounting upon the shaft I a notched wheel K.

L is a bifurcated member which is sleeved upon the shaft I and embraces the notched wheel K.

M is a double pawl pivotally connected to ears N on the member L and adapted to engage with the notches in the wheel K. Thus by rocking the member L and by means of the rod or handle engaging with a socket L′ therein the pawl M will cause the rotation of the notched wheel K, thereby revolving the shaft I and transmitting a rotary movement through the bevel gear-wheels to the threaded shanks $d$ of the two rods F. This movement will cause the lengthening or shortening of the rods by the opposite movement of the members $a$ and $e$ upon the right and left threaded shanks.

With the construction above described whenever it is desired to adjust the platen the clamping-bolts and nuts $g$ and $h$ are first released, after which the shaft I may be turned, through the medium of the handle and socket member L, until the required lengthening or shortening of the rods is effected. The clamping-bolts are then again tightened, so as to prevent further movement of the sections $a$ and $e$ in relation to the shank $d$. In this adjustment the sections $a$ and $e$ are moved oppositely in relation to the member G, which latter is held in longitudinally-fixed relation to the shank by a key $d'$ engaging an annular groove $d^2$, so that the length of exposed portions of the threaded shank is divided upon opposite sides of the member G and gear-wheel H. The latter serves to strengthen the central portion of the shank, and thus the strength of the rod is greater than it would be in a construction where the lengthening is caused by a single threaded shank.

In the shortest adjustment of the rods F the members $a$ and $e$ abut against shoulders on the member G and gear-wheel H, so as to form a continuous full cross-section for sustaining the load without throwing any strain upon the threads of the shank. Upon adjusting the rods to lengthen the same and where the press has to be employed for heavy work the rods may be strengthened by inserting shims or washers P between the adjacent faces of the members $a$ and $e$ and the central members G and H, so as to continue the full cross-section and to relieve the strain from the threads. To permit of such adjustment, the adjacent shoulders upon the members G and $e$ and also the adjacent shoulders upon the members H and $a$ are square— i. e., perpendicular to the axis of the shank and parallel with each other. Thus the washers or shims inserted between these shoulders are merely subjected to compression stress without any tendency toward displacement, and the rod is given practically the same strength as if made from a solid piece.

What I claim as my invention is—

1. In a press, the combination with the crank and movable platen, of an adjustable connecting-rod between said crank and platen comprising a plurality of sections, and a threaded shank adjustably connecting said sections, the adjacent ends of said sections forming square shoulders adapted to abut against each other and to be parallel when separated, and a shim or washer for insertion between said shoulders to receive the compression-stress and to relieve the stress on the threads of the shank.

2. In a press, the combination with the crank and the movable platen, of a rod connecting said crank and platen, formed in a plurality of sections, a threaded shank of lesser cross-section than said sections of the rod, engaging central threaded apertures therein and forming a means of connecting and adjusting said sections toward or from each other, the adjacent faces of said sections being perpendicular to the axis of said shank and rod to form square shoulders parallel with each other and variable-spacing shims or washers for insertion between said shoulders to receive the compression stress and relieve the same from the threads of said shank.

3. In a press, the combination with the crank-shaft and movable platen, of a plurality of rods connecting the cranks and said platen, each rod comprising a plurality of sections and a central threaded shank adjustably connecting said sections, a rotary shaft extending between said rods perpendicular thereto and having bearings in the central sections of said rods, bevel gear-wheels connecting said shaft and the threaded shanks of said rods and a ratchet connection to said shaft for rotating the same to simultaneously adjust said shanks and correspondingly lengthen or shorten said rods.

4. In a press, the combination with the crank-shaft and movable platen, of a plurality of rods connecting the cranks and platen, each comprising a plurality of sections having square abutting shoulders and a central threaded shank adjustably connecting said sections, the central sections of said rods projecting laterally toward each other, a shaft perpendicular to said rods journaled in bearings in said extensions of the central members, bevel gear-wheels on said shaft in recesses in said lateral extensions, bevel gear-wheels on said shanks intermeshing with said gear-wheels on said shaft and a ratchet connection to said shaft intermediate said lateral extensions for simultaneously rotating said shanks and correspondingly lengthening or shortening said rods.

5. In a press, the combination with the crank-shaft and movable platen, of a plurality of rods connecting the cranks and said platen, each rod comprising three sections, having square abutting shoulders and a threaded shank of lesser cross-section centrally connecting said sections, the central section of each rod being in a longitudinally-fixed position thereon and being provided with a lateral extension, a shaft perpendicular to said rods journaled in said lateral extensions of the central sections thereof, bevel gear-wheels fixed upon said shanks adjacent to said central sections and having a hub portion formed with square shoulders for abutting against said sections, bevel gear-wheels fixed upon said shaft and located in recesses in said lateral extensions and intermeshing with said bevel gear-wheels on said shanks, the threads on the opposite ends of said shanks being right and left and engaging correspondingly-threaded sockets in the end sections of said rods, said sockets being split and means for clamping said split sockets upon said threaded shanks.

6. In a press, the combination with the crank-shaft and movable platen, of a plurality of rods connecting the cranks and platen, each rod comprising three sections centrally connected by a threaded shank of lesser cross-section, the central section of said rod being sleeved upon said shank in a longitudinally-fixed position thereon and the end sections of said rod having respectively right and left threaded sockets for engaging corresponding threads on said shank, a bevel gear-wheel fixed on said shank adjacent to said central section and having square shoulders abutting thereagainst and against the adjacent end section, a rotary shaft perpendicular to said rods and journaled in bearings in said central sections and bevel gear-wheels on said shaft engaging with said bevel gear-wheels on said shanks, whereby the rotation of said shaft will adjust the end sections of said rods, to be equally spaced from the shoulders of said central section, and gear-wheel.

7. In a press, the combination with the crank-shaft and movable platen, of a rod connecting said crank and the platen formed in three sections, a shank of lesser cross-section centrally connecting said sections having a right and left threaded engagement respectively with the end sections and being in longitudinally-fixed relation to said central section, said three sections having square shoulders for abutting with each other and maintaining a full cross-section of the rod at all points therein when said shoulders abut and shims for insertion between said shoulders when separated from each other to receive the compression stress and relieve the same from the threads of said shank.

8. In a press, the combination with the crank-shaft and movable platen, of a plurality of adjustable rods connecting the cranks and said platen, a shaft extending between said rods perpendicular thereto having a geared connection therewith and a ratchet-lever connected with said shaft for rotating the same to simultaneously and correspondingly adjust said rods both above and below said geared connecting-shaft.

9. In a press, the combination with a crank-shaft and movable platen, of a plurality of adjustable rods connecting said platen and the cranks, a shaft extending between said rods perpendicular to and having a gear connection therewith, a ratchet-wheel on said shaft and a ratchet-lever having a reversible pawl, whereby said shaft may be rotated in either direction by said lever to correspondingly and simultaneously adjust said rods both above and below said geared connecting-shaft.

In testimony whereof I affix my signature in presence of two witnesses.

JOHN E. DOBSON.

Witnesses:
H. C. SMITH,
EDWARD D. AULT.